United States Patent
Evans et al.

(10) Patent No.: US 10,990,646 B2
(45) Date of Patent: Apr. 27, 2021

(54) SYSTEM FOR DYNAMIC USER INTERFACE GENERATION

(71) Applicant: HSBC Group Management Services Limited, London (GB)

(72) Inventors: James Michael Evans, Kingston Upon Thames (GB); Rajesh Gupta, Woking (GB); Vincent Moffat, London (GB); James Edward Peek, Chelmsford (GB); Shaun Smith, London (GB)

(73) Assignee: HSBC GROUP MANAGEMENT SERVICES LIMITED, London (GB)

( * ) Notice: Subject to any disclaimer, the term of this patent is extended or adjusted under 35 U.S.C. 154(b) by 0 days.

(21) Appl. No.: 16/622,507

(22) PCT Filed: Jun. 14, 2018

(86) PCT No.: PCT/GB2018/051648
§ 371 (c)(1),
(2) Date: Dec. 13, 2019

(87) PCT Pub. No.: WO2018/229499
PCT Pub. Date: Dec. 20, 2018

(65) Prior Publication Data
US 2020/0210513 A1    Jul. 2, 2020

(30) Foreign Application Priority Data

Jun. 15, 2017   (GB) ................................. 1709558

(51) Int. Cl.
*G06F 3/048* (2013.01)
*G06F 16/958* (2019.01)
(Continued)

(52) U.S. Cl.
CPC .............. *G06F 16/986* (2019.01); *G06F 8/38* (2013.01); *G06F 16/168* (2019.01);
(Continued)

(58) Field of Classification Search
CPC ...... G06F 3/048; G06F 3/0481; G06F 3/0482; G06F 8/38; G06F 16/16; G06F 16/18;
(Continued)

(56) References Cited

U.S. PATENT DOCUMENTS 7,827,478 B2 * 11/2010 Farr ...................... G06F 40/174
715/222
10,691,873 B2 * 6/2020 Ben-Aharon ......... G06F 40/186
(Continued)

OTHER PUBLICATIONS

PCT International Search Report from the International Application No. PCT/GB2018/051648, dated Sep. 24, 2018, 15 pages.
(Continued)

*Primary Examiner* — Xiomara L Bautista
(74) *Attorney, Agent, or Firm* — Tucker Ellis LLP; Michael G. Craig

(57) ABSTRACT

A computer-implemented method of generating a form definition for a user interface form is disclosed. The method involves retrieving form definition data for a requested form from a database. One or more overrides are optionally applied to the form definition data to modify properties of form elements. Form instance data for the modified form is generated and stored for reuse. The form instance data is transmitted to a rendering module at a client device for generation of a user interface form based on the form instance data.

19 Claims, 9 Drawing Sheets

(51) Int. Cl.
*G06F 16/18* (2019.01)
*G06F 16/16* (2019.01)
*G06F 40/186* (2020.01)
*G06F 40/174* (2020.01)
*G06F 8/38* (2018.01)

(52) U.S. Cl.
CPC ........ *G06F 16/1873* (2019.01); *G06F 16/972* (2019.01); *G06F 40/174* (2020.01); *G06F 40/186* (2020.01)

(58) Field of Classification Search
CPC .... G06F 16/958; G06F 40/174; G06F 40/186; G06F 15/00; G06F 17/00; G06F 17/21; G06F 17/30
See application file for complete search history.

(56) References Cited

U.S. PATENT DOCUMENTS

| | | | | |
|---|---|---|---|---|
| 2006/0101051 A1* | 5/2006 | Carr | ............ | G06F 40/174 |
| 2007/0055924 A1* | 3/2007 | Farr | ............ | G06F 40/174 |
| | | | | 715/207 |
| 2007/0208669 A1* | 9/2007 | Rivette | ............ | G06Q 50/184 |
| | | | | 705/59 |
| 2009/0083616 A1 | 3/2009 | Ali et al. | | |
| 2010/0174974 A1* | 7/2010 | Brisebois | ............ | G06Q 10/00 |
| | | | | 715/223 |
| 2012/0137235 A1* | 5/2012 | Sabarish | ............ | G06F 8/34 |
| | | | | 715/763 |
| 2014/0032604 A1* | 1/2014 | Young | ............ | G06F 40/131 |
| | | | | 707/797 |
| 2015/0379244 A1* | 12/2015 | Pathak | ............ | G06F 21/10 |
| | | | | 726/28 |
| 2016/0266881 A1* | 9/2016 | Thompson | ............ | G06F 9/445 |

OTHER PUBLICATIONS

United Kingdom Examination Report from the corresponding Patent Application No. GB1709558.9, dated Nov. 9, 2017, 12 pages.
Wikibooks online, Xforms/Versioning Form Data with Webdav and Subversion, Sep. 12, 2019, 5 pages.
Orbeon online, Versioning in Form Builder / From Runner #1157, dated Sep. 12, 2019, 3 pages.

* cited by examiner

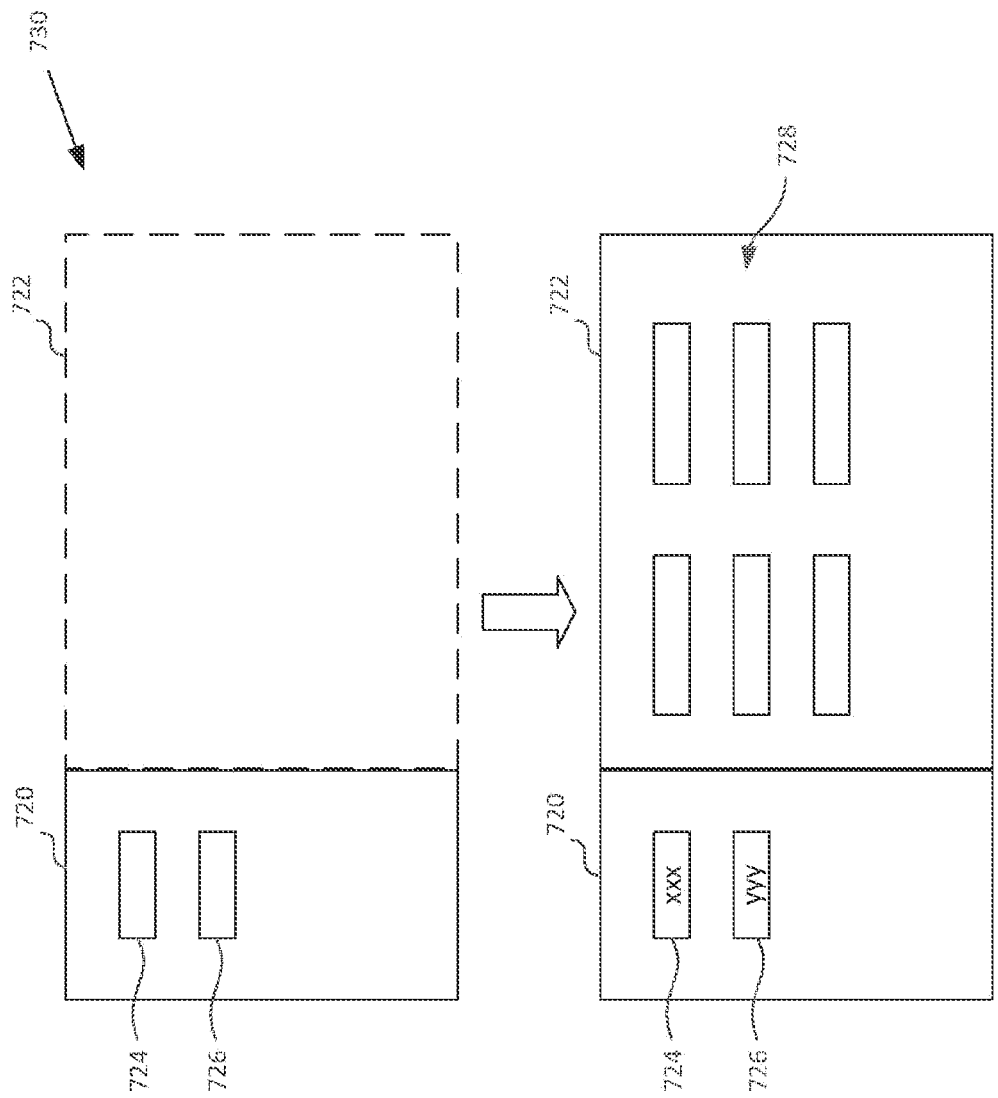

Fig. 7B

SYSTEM FOR DYNAMIC USER INTERFACE GENERATION

CROSS-REFERENCE TO RELATED APPLICATIONS

This application is a national phase application of International Application No PCT/GB2018/051648, filed Jun. 14, 2018, which claims priority to Great Britain Patent Application Serial No. 1709558.9, filed Jun. 15, 2017, all of which are incorporated herein by reference.

BACKGROUND

The present invention relates to a system for dynamically generating user interfaces, in particular user interface forms for entering, editing and displaying data.

Data-driven user interface generation presents a variety of technical challenges. For example, while the use of a data-driven approach removes the need for a user interface to be hard-coded by a programmer, much of the flexibility of manually crafted user interfaces can be lost. In environments where user interfaces change regularly, data-driven approaches can also result in a proliferation of incompatible form definitions, which can be difficult to manage, and can lead to errors, for example when form fields are added to or deleted from a form definition after a form has been used to input data.

SUMMARY

The invention seeks to alleviate some problems associated with prior art systems.

Accordingly, in a first aspect of the invention, there is provided a computer-implemented method of generating a form definition for a user interface form for transmission to a user interface module, comprising: receiving a form request comprising form identification data identifying a requested form; retrieving from a database: form definition data for the requested form based on the form identification data; and at least one override data element defining an override, the override data element specifying an override condition for applying the override and one or more form data modifications; generating form instance data, the form instance data comprising a data description of the form based on the retrieved form definition data, as modified based on the at least one override data element, the generating comprising, for the (or each) override data element: determining whether the override condition defined for the override is fulfilled; in response to determining that the override condition is fulfilled, applying the form data modification(s) defined for the override to the retrieved form definition data; and wherein the method further comprises outputting the form instance data to the user interface module for generation of a user interface form based on the form instance data.

The term "form" as user herein preferably refers to a user interface, including a collection of user interface elements (such as input fields, selection lists or buttons, checkboxes, text labels, and the like) which can be used to input data. Such a form may, for example, be presented as part of a user interface for a data entry application. The term "form definition" refers to a set of structured data specifying the form elements and their properties, from which a form can be generated. A form definition may correspond to a particular version of a form in the case where versioned form definitions are stored. The term "form instance" preferably refers to a particular instance of a given form definition (version), which may have been generated in response to a specific user request. Different form instances generated from the same form definition may be different (e.g. due to application of different overrides and other control parameters controlling the form generation process). The data representation of a form instance (e.g. as a JSON document) may be different than the data representation of the original form definition (e.g. as structured data entities in a database). The term "override" preferably refers to a modification rule applied at time of form instance generation to modify a form definition based on a condition.

Form definitions stored in the database and form instances generated from them therefore provide data-driven representations (or data descriptions) of forms and are therefore preferably not executable code (whether machine, virtual machine, object, or high-level code or executable script), though data elements within the data descriptions may include references to external code (e.g. calls to obtain data values from external sources).

The retrieved form definition data preferably includes a plurality of data elements defining form elements and specifying values for properties of the form elements. An override data element (or each such element) is preferably associated with a given form element, the form data modifications defined for the override including one or more override values for one or more properties of the associated form element. Applying the form data modification(s) of the override then preferably comprises setting one or more properties of the associated form element (in the form instance data) to corresponding override values specified in the override data element.

Properties of form elements not modified by an override are preferably set (in the form instance data) based on the form definition data. Thus, a form instance is preferably generated in accordance with the form definition data except that specific aspects or properties may be modified by overrides.

The override condition of an override is preferably associated with a control parameter controlling applicability of the override. More particularly, the override condition of an override may specify a control parameter controlling applicability of the override, and a parameter condition relating to the control parameter, the method comprising determining that the override condition is fulfilled if the control parameter meets the specified parameter condition. Thus, the parameter controlling whether an override applies is preferably specified in data and configurable, rather than being fixed. In a preferred example, the parameter condition specifies one or more values of the control parameter (e.g. explicitly or alternatively implicitly by specifying a threshold or range), the method determining that the override condition is fulfilled if the specified control parameter has a value corresponding to the specified value (or one of the specified values). The control parameter may be a parameter received by the request, a context variable available to the system, a parameter obtained from an external data source, and the like. In a preferred example, the control parameter comprises a form field, the form field preferably associated with a second form, the second form optionally displayed to a user prior to or concurrently with the requested form.

An override data element may specify values for a plurality of properties of a form element, the method comprising setting values for each property of the form element to the override values if the override condition is met. Overrides may specify null values for one or more properties, in which case those properties are preferably not modified by the override.

Preferably, the override specifies values for one or more properties of the form element, the properties defining one or more of: a visual appearance of a form element; interactive behaviour of a form element; and a data value associated with a form element. More specifically, the properties may include one or more of: a property specifying whether the form element is visible or invisible; a property specifying whether the form element is editable or read-only; a property specifying whether the form element is mandatory or optional; a property specifying a default value for the form element; and a property specifying a label to be displayed for the form element.

A given override (or each such override) is preferably associated with one of: a data input form element, preferably an input field, and a form structuring form element, preferably a section element defining a section of the form. However, the concept may be extended to apply overrides to any other type of form element.

The method may comprise applying a plurality of overrides to the retrieved form definition data, preferably in accordance with respective priority indicators associated with each override (this may involve applying data modifications or form element property values from higher-priority overrides in preference to corresponding modifications specified by lower-priority overrides).

The method preferably comprises storing the generated form instance data in a database. The stored form instance therefore reflects both the form that was requested and any overrides that were applied (and/or other modifications performed). The form instance is preferably stored in a form that can be directly processed by the user interface module (e.g. unlike the form definition data on which the form instance is based). Thus, the form instance is in a sense "compiled" from the form definition data and stored in the complied form for later reuse.

The method may comprise generating the form instance data based on the form definition data in dependence on one or more control parameters, and preferably associating values of the control parameters used to generate the form instance data with the stored form instance data in a database, for example as a key consisting of one or more parameter values. The key can then be used to determine if a form instance already exists for a given form request with a particular set of control parameter values.

The method may thus further comprise, in response to a later form request specifying the given form (i.e. a request received subsequent to the original request and generation of form instance data), retrieving and outputting the stored form instance data in response to the request. This may advantageously be done without regenerating the form instance data from stored form definition data. The later form request may request the same form with the same one or more control parameter values, the method comprising retrieving and outputting the previously stored form instance data based on the request and control parameter values (e.g. by selecting the form instance from the database based on a form identifier and a key corresponding to control values as mentioned above).

The method preferably comprises receiving form input data corresponding to the form following interaction with the form by a user, the form input data comprising data values for one or more input field form elements of the form, and storing the form input data in a database as a form input data record, wherein the form input data record is associated in the database with the form instance data generated for the form. The form input data record may be stored as a single data entity, e.g. a set of field/value pairs corresponding to the fields of the form, for example as a JSON document or other document/file specifying field values using a data description language. Form input data records are also referred to herein as "tickets" or "form tickets". The form input data record may alternatively or additionally be associated with the form definition or form version used to generate the form (instance).

The method may comprise, in response to a request to view or edit the form input data record storing data previously captured using the form, identifying the associated form instance data, and transmitting the identified form instance data and the input data record to the user interface module. Using the same form instance ensures that the form generated to view or edit the data will correspond to (and may be identical to) the form used to enter the data originally.

The database preferably stores versioned form definitions. Versioning may preferably be applied at the level of the form itself and/or at the level of individual form elements. Thus, modifications to a form definition (or element definition) preferably result in a new version of the form (or element) definition being created in the database.

Thus, the method may comprise, in response to modification of a form definition, creating a new version of the form definition reflecting the modification, whereby subsequent form requests may use the new form version.

Preferably, in response to a request to create a new input data record using a specified form, a latest (most recently created) version of the form definition is identified in the database for the specified form and the form instance data is generated based on the identified form definition data.

The method may comprise, in response to a request to modify an existing input data record, identifying a version of a form definition used to input the input data record from a plurality of versions of the form definition, and outputting form instance data defining a form for editing the input data record based on the identified version of the form definition, preferably wherein the identifying step uses a reference stored with the existing input data record to the form definition version used to capture the input data record. The term "capturing" data as used herein preferably refers to recording data values supplied using a form; such data values may be actively input by the user or the user may merely accept suggested data values and the user may not supply values for some fields in which case null or empty values are captured.

In a further aspect of the invention, there is provided a computer-implemented method of generating a form definition for a user interface form for transmission to a user interface module, comprising: receiving a form request comprising form identification data identifying a requested form; retrieving from a database form definition data for the requested form based on the form identification data; generating form instance data based on the retrieved form definition data and optionally one or more control parameters relating to the request, the form instance data comprising a data description of the requested form; storing the form instance data in the database; outputting the form instance data to the user interface module at a client device for generation of a user interface form based on the form instance data; receiving from the client device form input data including one or more input field values for the form in response to user interaction with the form; storing the form input data as an input data record; and associating the input data record with the stored form instance data in the database.

The method may comprise receiving a further request, wherein the further request is a request to view or edit the previously stored input data record; retrieving the stored form instance data based on the request; and transmitting the stored form instance data to the client device for generation of a form for viewing or editing the input data record. This allows the data to be viewed or edited using the same form as used to enter the data, avoiding incompatibilities that might result from changes to form definitions and the like. The request preferably includes an identifier for identifying the stored input data record, the method including accessing the stored input data record using the identifier; and identifying the stored form instance data associated in the database with the stored input data record.

The method may comprise receiving a further request, wherein the further request is a request for a form to enter a new input data record, the method comprising generating form instance data for the form from stored form definition data in response to the request.

The database may store a plurality of form definition versions of the requested form, the method comprising selecting one of the form definition versions and generating form instance data based on the selected form definition version. The selecting step may comprise selecting: a most recent form definition version, or a form definition version specified in the request.

The form definition data preferably comprises a data description of the form and includes a plurality of data elements defining form elements and specifying values for properties of the form elements. Generating form instance data based on the retrieved form definition data may comprise modifying one or more form element properties in dependence on the at least one control parameter.

The retrieved form definition data may comprise at least one override data element defining an override, the override data element associated with a form element of the form and specifying: an override condition for applying the override; and override values for one or more properties of the associated form element; the method preferably further comprising: generating the form instance data based on the retrieved form definition data, as modified by the overrides, the generating comprising, for the or each override: determining whether the override condition is fulfilled; in response to determining that the override condition is fulfilled, setting one or more properties of the associated form element to corresponding override values specified in the override definition. The override condition may specify a control parameter controlling applicability of the override, and a parameter condition relating to the control parameter, the method comprising determining that the override condition is fulfilled if the control parameter meets the specified parameter condition, preferably wherein the parameter condition specifies one or more values of the control parameter, the method determining that the override condition is fulfilled if the specified control parameter has a value corresponding to one of the specified values.

The override may specify values for one or more properties of the form element, the properties preferably relating to one or more of: visibility of a form element; interactive behaviour of a form element, and a data value of the form element, and/or wherein the properties include one or more of: a property specifying whether the form element is visible or invisible; a property specifying whether the form element is editable or read-only; a property specifying whether the form element is mandatory or optional; a property specifying a default value for the form element; a property specifying a label to be displayed for the form element. The (or each) override may be associated with one of: a data input form element, preferably an input field, and a structural form element, preferably defining a section of the form.

A method according to this aspect may comprise the further steps or features of a method as set out in the preceding aspect of the invention (and vice versa). The following optional features may be applied to either aspect of the invention.

The method may further comprise, at the user interface module: receiving the form instance data; generating a user interface form based on the form instance data; and displaying the user interface form. The generating step may comprise generating a web document (preferably an HTML document) representing the form, and preferably wherein the displaying step comprises outputting the web document to a browser application for display. The process of generating an HTML document for a form for display by a browser may also be referred to herein as "rendering" the form. Thus rendering may or may not include displaying the form on a screen (which may be done separately by a browser based on the rendered HTML version of the form).

The method may comprise receiving a render mode indicator identifying one of a predetermined set of rendering modes; and generating the user interface form based on the identified render mode; preferably wherein the user interface module modifies one or both of the appearance and the behaviour of the form in dependence on the selected render mode. The render modes may include one or more of: a render mode for generating a form to display data without permitting editing of the data (e.g. where input elements are set to read-only); and a render mode for generating a form for displaying and editing data.

The form instance generation is preferably performed at a form generation module, preferably at a form server (which may include the database(s) storing form definitions, form instances and input data records, or the database(s) may be stored elsewhere). The user interface module is preferably provided at a client device (e.g. as a software module such as a browser or browser add-on) connected to the form server over a computer network.

The method may comprise caching the form instance data at the user interface module. Preferably, the method comprises, at the user interface module, determining whether form instance data for a requested form has been cached at the user interface module; if so, retrieving the locally cached form instance data and generating a form for display based on the locally stored form instance data; and if not, sending a request to retrieve or generate the form instance data to a form server, receiving form instance data from the server, and generating a form for display based on the received form instance data.

The method may comprise, at the user interface module, receiving data values corresponding to input values of the form in response to user interaction, and transmitting the data value to the form generation module or database for storage as a form data record (e.g. in response to form submission by a user).

Form definition data for a form is preferably stored as one or more data entities in the database, preferably in accordance with a relational or object-oriented data schema. Thus, the database may be a relational database storing form definition data in one or more database tables or an object database storing form definition data as one or more objects. The generated form instance data is preferably generated, stored and/or transmitted in the form of a data description file or document, preferably in accordance with a data description or markup language (e.g. in a text or human-readable format); preferably wherein the form instance data for the form is transmitted to the user interface module and/or stored in the database as a JSON (JavaScript Object Notation) document. Thus, the form instance generation may involve translation of a form definition from a first format (in which it is stored in the form definition database) into a second, different format (in which it is transmitted to the client device and/or stored for later reuse). The translation may involve modifying the form definition obtained from the database, e.g. based on overrides, control parameters and the like.

The invention also provides a tangible computer-readable medium comprising software code adapted, when executed on a data processing apparatus, to perform a method as set in any of the aspects above, or as described elsewhere herein.

The invention further provides a system, apparatus, or computer device having means (e.g. in the form of at least one processor with associated memory) for performing any method as set above or as described elsewhere herein. Such a system may include a form server and/or (including a form generation module) and a client device (including the user interface module), adapted to communicate over a data network.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIG. 7A illustrates multiple forms cooperating to implement dynamic behaviour;

FIG. 7B depicts an example form generated using the system;

DETAILED DESCRIPTION

Embodiments of the invention provide a system, referred to herein as the dynamic form engine, for dynamically generating data entry forms from form definitions stored in a database. The dynamic form engine can manage the definition, dynamic display, validation and storage for form presentation and associated data capture including versioning through time.

The system allows form structure (sections, fields, formatting) to be defined in data with no coding. Form structure can dynamically change dependent on previous form field entries. Form fields can be populated virtually via data configuration with no coding. Several layers of validation can be configured for each form field, again in data with no coding, ensuring governance and data quality. Form fields are intelligent and can be configured to default, auto-populate or change their options based on the population of other fields in the form. Form element definitions can be modified by way of an override mechanism, and captured data is associated with the form instance used to enter the data to allow subsequent editing via the same form, irrespective of subsequent changes to the form definition. The dynamic form engine can be integrated with existing workflow engines.

Figure 1:
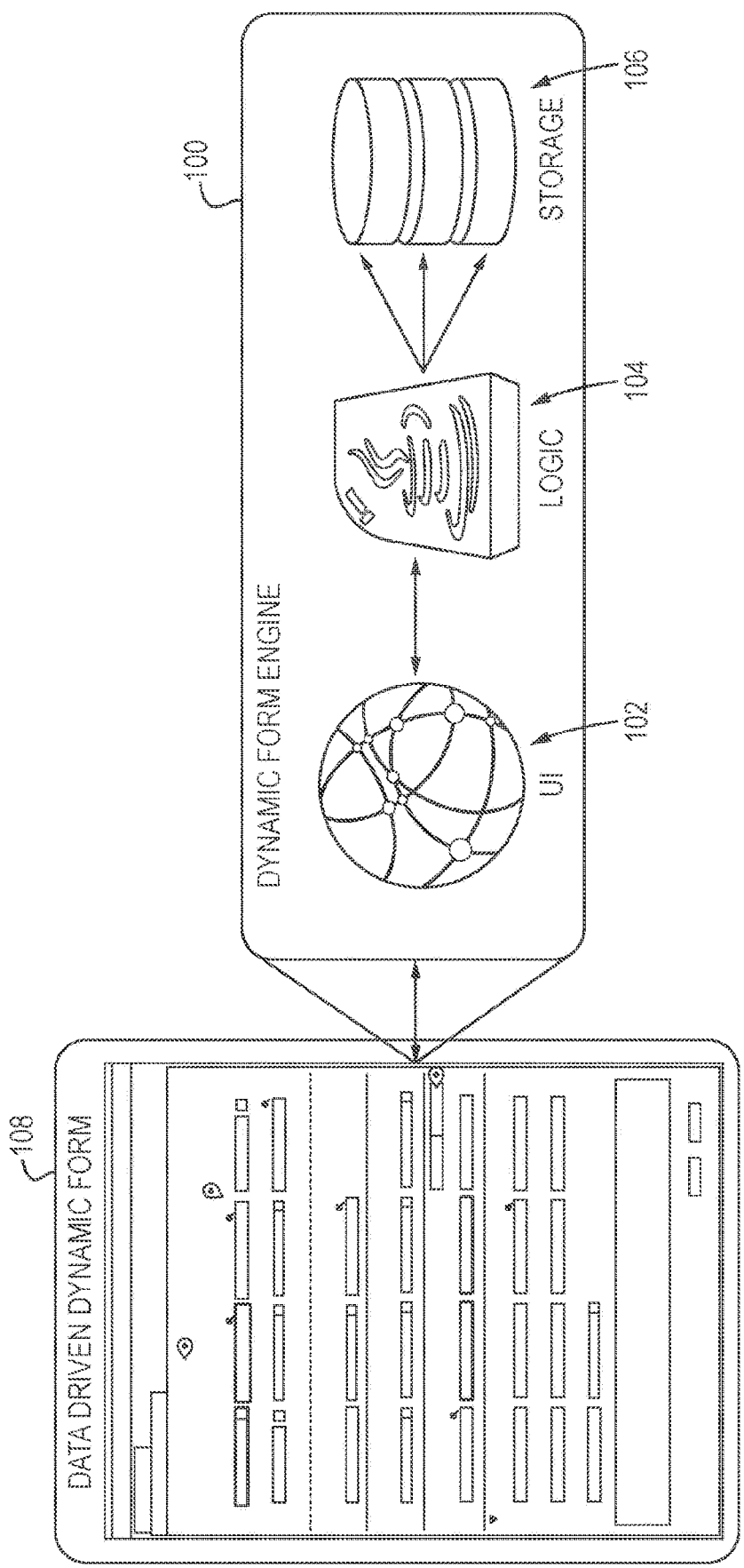
FIG. 1 illustrates a system for data-driven form generation in overview.

The dynamic form engine 100 is illustrated in overview in FIG. 1 and is constructed from three core components:

User Interface (UI) layer 102: Rendering engine and component library

Logic layer 104: Form generation logic and validation library

Storage layer 106: Data schema and services

These components together support the creation, storage and use of a number of data elements used in representing dynamic, data-driven forms.

In particular, form definitions and data entered via forms are stored in the storage layer 106. The logic layer 104 acts as an intermediary between UI layer 102 and data storage layer 106, processing form requests and generating form instances based on form definitions from the database. The rendering engine at the UI layer 102 is responsible for rendering a defined form for display to a user—in a typical example, forms are rendered as HTML for display in a web browser. The UI layer receives input entered into a form by a user and forwards it to the logic layer 104 for validation and storage in the storage layer 106.

Figure 2:
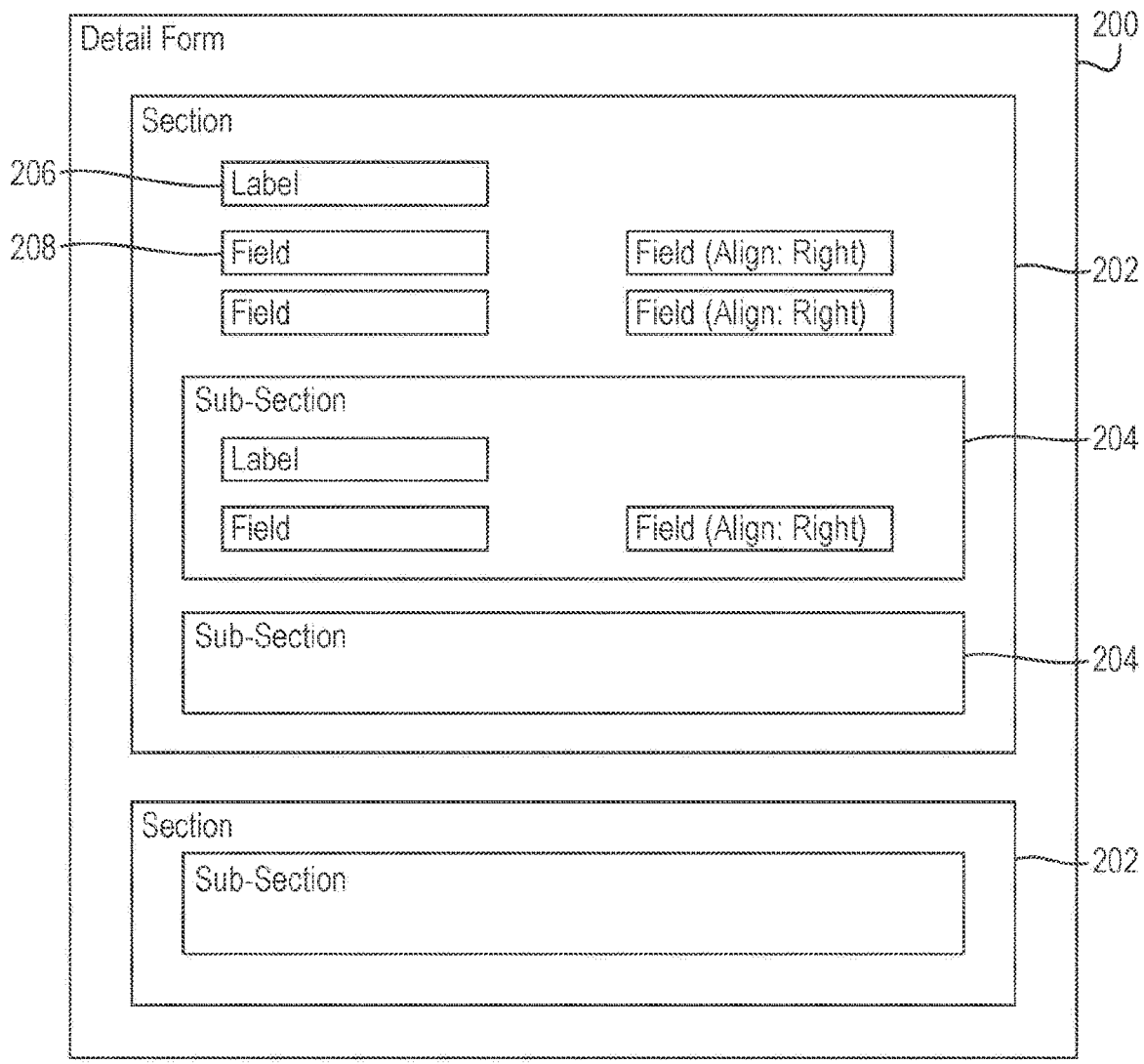
FIG. 2 depicts a simplified example of a form having a number of form elements.

A generic example of a form is depicted in FIG. 2. As illustrated, a typical form 200 may optionally include one or more form sections 202. Sections may be nested, so that a section 202 may further include subsections (e.g. 204). Arbitrary levels of nesting may be supported. The form may further include data entry fields (e.g. 208) with associated field labels (e.g. 206), which may be arranged within sections or directly within the form.

Fields may have data types associated with them (specifying the type of data that may be entered). Fields may further have validation constraints associated with them (e.g. to specify a valid numerical range for a numerical entry field). Any form elements (including fields, labels and sections) may also have other associated attributes, e.g. controlling whether an element is visible or hidden or (for entry fields) whether a field is editable or read-only, or whether completion of the field is optional or mandatory prior to form submission (note the terms "attribute" and "property" in relation to form elements such as fields are used interchangeably herein, and refer to any data element in a form definition that defines a characteristic of the form element).

Different types of entry fields are supported. For example, in addition to standard input fields allowing value entry by keyboard, field types may include list boxes and drop-down boxes, checkboxes, radio buttons and the like. More complex types of user interface controls may also be supported, such as sliders or dials. Components are implemented at the UI layer via component libraries (e.g. in Java), and bespoke components may be added to the form definitions if corresponding components are added to the UI component library. The term "field" as used herein encompasses any type of user interface control via which data input can be carried out.

Storage Layer and Data Representation

The storage layer 106 comprises the data schema and services supporting the entire configuration to generate a form, capture a form, version it and persist the data captured through it. In a preferred embodiment the data schema and data services are implemented in an Oracle database environment, but any other suitable database technology may be used.

The storage layer manages a set of data entities for representing form data, including both data descriptions of the structure the forms and data entered (captured) using the forms. The data representation includes inter alia the following data entities:

The Form Definition
The Form Version
The Field Version
The Form Instance
The Form Ticket The Form Definition: The form definition describes the form identity, its structure, available content and behaviour. It also provides the basis for versioning and data capture.

The components of a form described by a Form Definition are:

Form Identity
Sections
Fields
Field Types
Field Attributes (or properties)
Field Constraints
Field Overrides
Field Associations
Field Expressions (Data Sources)

The form definition defines the form displayed to the user. All data captured from a form is stored as a form ticket along with a form instance and a form version.

The Form Version: A Form Version is a versioned Form Definition. When a master Form Definition is modified a new Form Version is created. In that respect Form Versions are treated by the system as being immutable (since modifying a form definition creates a new version of the form).

The Field Version: A Field Version is a versioned Field Definition. When a master Field Definition is modified a new Field Version is created.

The Form Instance: A Form Instance is a "compiled" Form Version with overrides applied (see the discussion of overrides below). Form Instances are immutable and therefore cacheable on the client.

The Form Ticket: A Ticket represents data entered into a form (or more specifically, a form version) by a user. Thus, the form ticket consists of a list of values for the fields defined on a form version.

Figure 3:
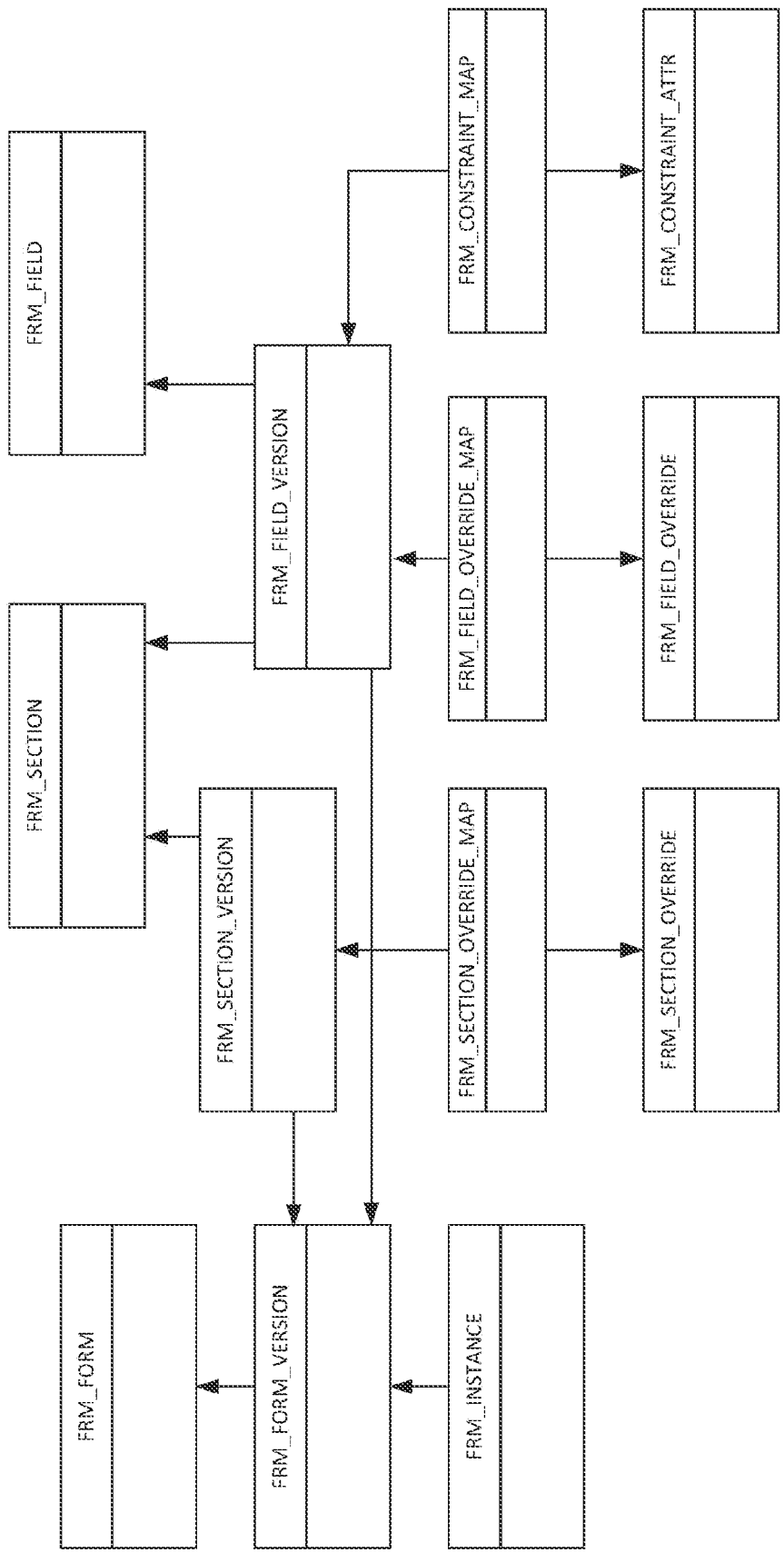
FIG. 3 illustrates a simplified data schema used to store form definitions.

A simplified version of a data schema representing the above entities (e.g. as relational database tables) is depicted in FIG. 3. This shows the main form components (form, section, field) with associated component versions (form version, section version, field version). Any modification to an existing form (version), section (version) or field (version) generates a new version of the component. This ensures full versioning of the form definitions. Section and field overrides (discussed in more detail below) may be associated with section versions and field versions, and validation constraints (defining constraints on the value a field may take) may be associated with field versions. In each cases these associations are many-to-many (implemented by the "map" tables), allowing multiple overrides and constraints to be defined for each element, whilst also allowing reuse of override and constraint definitions across different elements.

Figure 4:
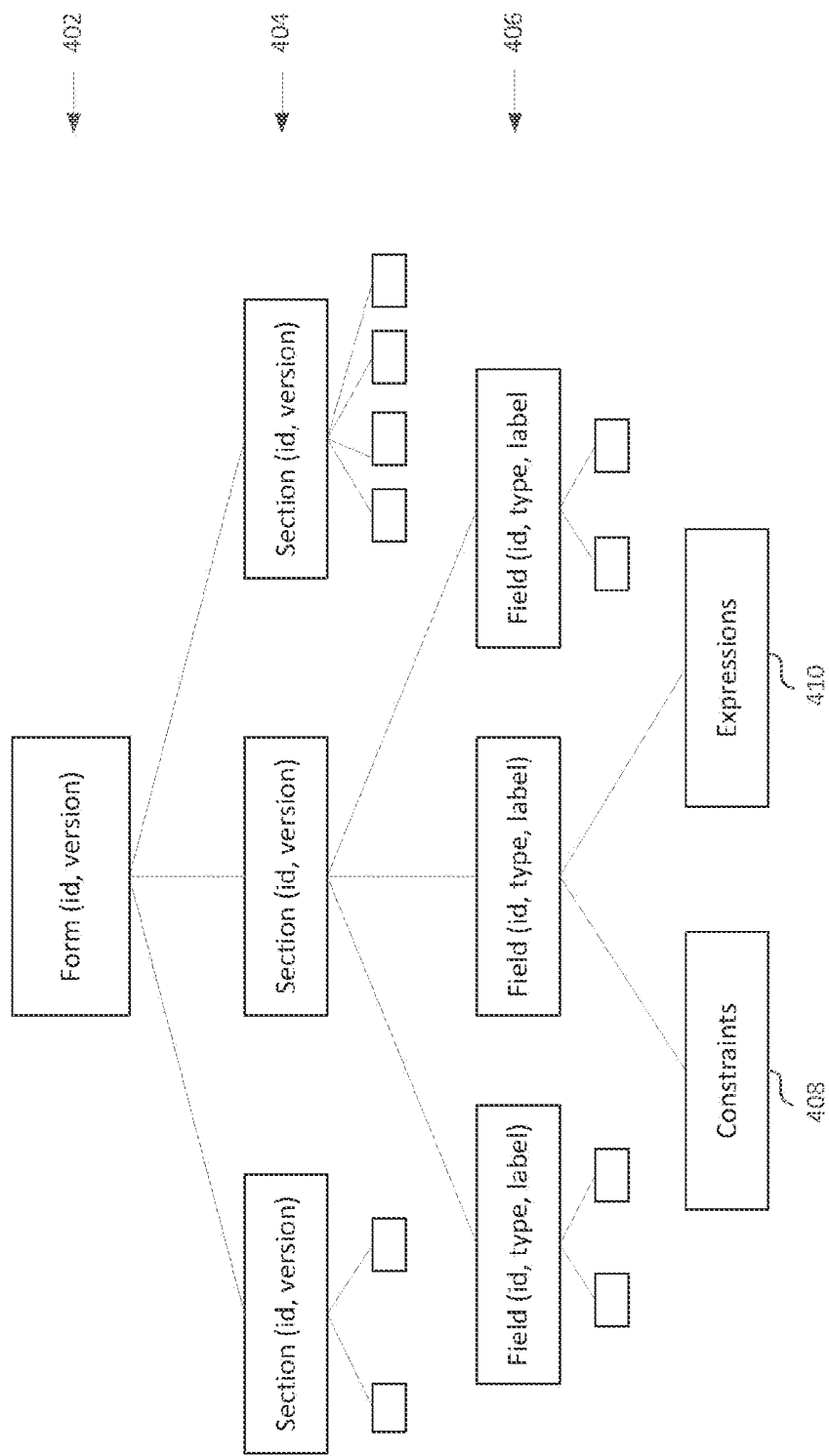
FIG. 4 depicts a hierarchy of data entities making up a form definition.

Structurally the form elements are arranged in a hierarchy as depicted in FIG. 4. Each form 402 is identified by a form identifier and a version identifier (identifying a specific version of the form). Each form 402 may consist of a number of form sections 404, where a section represents a group of fields. Each section is again identified by a section identifier and a version identifier identifying a specific version of the section. Each section 404 in turn includes any number of data fields 406. Each field 406 is identified by a field identifier, a field datatype specifying the type of data that the field accepts, and a field label which is displayed adjacent the field in the form when displayed (plus optionally also a field version identifier, not shown).

Each field may optionally be associated with one or more constraints 408, which define constraints on the values that may be entered (for example, maximum/minimum values) and are used for automatic validation. Each field may also be associated with one or more expressions 410 defining field content. For example, expressions may specify a default value or expression for determining a default value, which may include calls to external code routines to obtain relevant values (e.g. from an external data source). Expressions may also specify values (or calls to obtain relevant values e.g. from an external data source) to populate a drop-down or list box or other set of options from which the field value can be selected.

While not depicted in FIG. 4, sections may also be nested, so that a form section may include one or more other form sections (as described above).

Logic Layer

The form generation logic 104 actions requests sent from the UI, interrogates the data schema and data on the Storage layer 106 and processes the results into a response that is sent to the UI layer. The response typically defines a form that is to be displayed and is formatted to fit the UI render models.

In a preferred embodiment, the Logic layer is implemented as Java code.

Generation of forms by the logic layer is described in more detail below.

The logic layer may additionally perform validation based on constraints defined for form fields. Alternatively, such validation may be performed at the user-interface layer.

User Interface Layer

The UI provides a rendering engine which presents a targeted form dynamically, based on user choices of specified driver fields, from a library of pre-configured form definitions. Once the form is chosen the UI then further manages behaviour of fields within the chosen form. Driver fields are fields whose values are used to trigger certain dynamic behaviour of the form (including overrides). A value for a driver field may be entered directly by a user, selected from a list (e.g. populated from a dynamic database search) or entered in any other way. Modification of the driver field value can then automatically alter how the form is presented, e.g. by hiding fields or options (or whole form sections) that are not relevant, making others visible, or changing other form and field properties. The operation of overrides is described in more detail below.

The operation of the UI tier is based on:
Form definitions received from the form generation logic
A set of predefined form element types, form field types and field attributes that may be used in the form definitions
A set of predefined form render modes dictating how forms are rendered
Form field component libraries, comprising UI code for each type of form element. The UI code for an element manages the element's behaviour, and the layout of its children (e.g. fields within a section).

As indicated above, the UI supports multiple render modes, and will present the same form definition with different layout and behaviour depending on the UI render mode selected for the given use case.

The render modes can provide both a different look (e.g. akin to skins or themes) and different behaviour for the same form under differing scenarios. Thus, each render mode displays a form based on the same underlying form definition and data (field values), but the displayed data may be presented in different ways (e.g. suppressing certain fields in certain modes, displaying fields in different orders etc.). Different render modes may also allow different forms of user interaction (e.g. entry/modification vs. read-only).

In one example, Render Modes might include, for example:
an Input mode (for input of new data),
an Authorisation Review mode (for review/amendment of previously entered data),
a Read Only Review mode (for review without amendment), and
a Preview mode (e.g. to provide a compact read-only summary of the data).

Different form field component libraries (implementing the fundamental form elements) may be used for different render modes.

The user interface layer may be implemented as one or more software modules running at a client device, for example as a standalone application or as a browser add-on for processing form requests from web pages or web applications, or in any other suitable form.

Form Generation and Rendering Process

Figure 5:
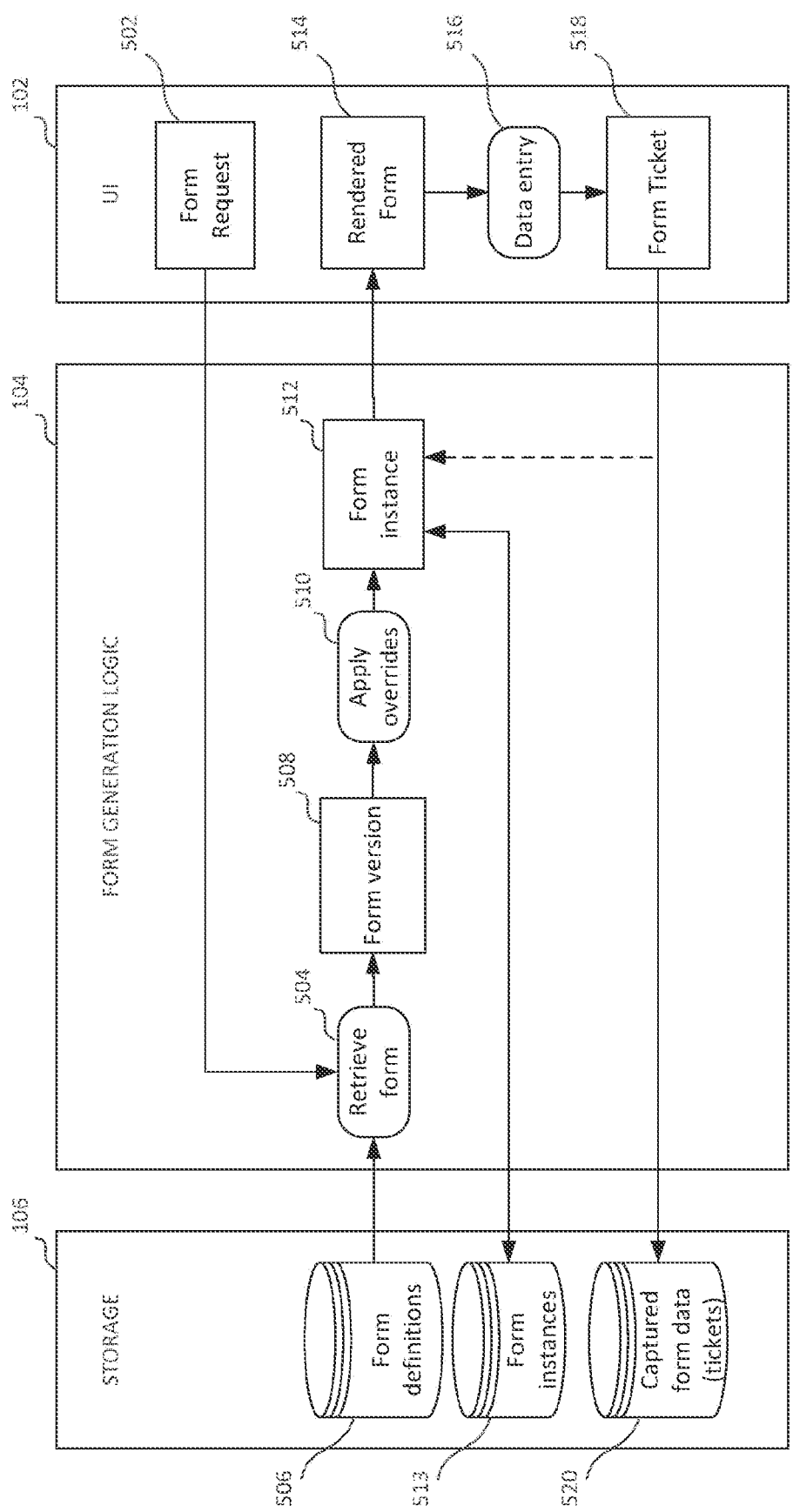
FIG. 5 illustrates the form generation system and its operation.

FIG. 5 illustrates the process of requesting, displaying and receiving input through a dynamic form.

The process begins with the user interface tier 102 requesting a form. For example, the request may be generated by a web application. In one example, a user wishing to enter data via a form may select an appropriate option in the web application, in response to which the request is generated by the user interface layer.

The request 502 specifies a form identifier and a form version identifier to identify a specific required version of the form. Alternatively, the request may simply identify a particular form, and the system may default to using the latest stored version of the form. The request may also include one or more control parameters to control the form generation process.

The request is received at the form generation logic 104. The form generation logic retrieves (step 504) the form definition 508 for the required form version from the form definitions database 506 in the database layer 106. The form generation logic applies any applicable overrides (step 510) to adapt the form definition (e.g. based on driver fields, context, parameters in the form request, data retrieved from a data source etc.) For example, application of overrides may hide certain form fields or sections or make certain hidden fields or sections visible, change fields between mandatory and optional, and the like. The form generation logic then generates a form instance 512, which is stored in form instance data 513 in the database.

The form instance 512 provides an encoded data description of the form that is to be displayed to the user (including any overrides that have been applied). The form instance thus defines the form elements that make up the form (e.g. sections and fields), the values of any element properties (e.g. labels, field types, read-only flags and the like), and any default field values. The form instance is transmitted to the user interface layer 102. The user interface layer includes a rendering module which renders the form based on the received form instance. The rendered form 514 may, for example be in the form of HTML (optionally including JavaScript or other browser-side code to implement dynamic behaviour such as front-end validation). Thus, the term "rendering" as used herein includes generation of HTML or other code for the form, for processing by a browser. Alternatively, the renderer could directly generate and display user interface elements (e.g. if a browser is not being used as a front-end).

A user then enters data (step 516) using the form. The captured data is encoded as a form data record, referred to herein as a form ticket 518, which specifies the data entered for each form field and is associated with the form instance 512 used to generated the form with which the data was entered. Note that form fields may include default values or empty fields which may not be changed by the user; for clarity, references herein to the "captured" or "entered" data includes such values not actually supplied by the user and thus the captured values in the ticket may also include default or null values in addition to values supplied by the user.

The ticket 518 is thus a list of field values corresponding to the form fields defined in the form instance. The ticket is transmitted to the database layer where it is stored in a tickets database 520 (this may occur via the form generation logic which may receive the ticket and send it to the database layer for storage, optionally after validating or otherwise processing the data). An identifier of the form instance 512 used to enter the data is stored with the ticket (as part of the ticket, or otherwise associated with it), to thereby associate the ticket with the form instance in the database.

In one embodiment, the form instance 512 transmitted by the logic layer 104 to the UI layer 102 is encoded as a JSON (JavaScript Object Notation) document, defining the form sections and fields and other elements. The UI rendering engine interprets the JSON document to construct the form (e.g. by creating a corresponding Java object hierarchy representing the form, and then generating HTML from the Java objects). The form ticket may similarly be encoded as a JSON document, for example encoding entered data as a set of <field ID, value> pairs, where the field ID references a corresponding field identifier in the form instance (and form version from which the form instance was constructed, since the field identifiers in the form instance preferably match those in the form version definition).

At the databases 513, 520, the form instances and tickets may be stored directly as JSON documents or alternatively they may be stored using a suitable relational data model or in any other way.

Note that, for descriptive purposes, data sets 506, 513 and 520 are discussed herein as if they were distinct databases. However, the distinction is conceptual, and these data sets may be combined into fewer physical databases (or divided in any appropriate way into multiple databases). For example, the data sets may be stored in a single Oracle database.

The above describes a process of entering a new data record using the form, with the data record stored as a form ticket.

Each ticket, once entered, is associated in the database layer 106 with the form instance 512 used to enter data for the ticket. The form instance itself is based on a specific version of a specific form (possibly with overrides applied). Thus the data entered by the user that is stored in the ticket maintains a link to the exact definition of the form used to enter it. This allows subsequent editing of the ticket without problems even if the form definition has changed subsequently (e.g. to add or remove fields).

For example, if the original form definition is modified, a new form version will be created in the form definitions database 506 and subsequent data entry will generally use the new version of the form (generating new form instances). However, in the case where a user wishes to edit an existing data record, stored as an existing ticket in the database, the system operates as follows.

In this example, a form request 502 is sent as before, the request specifying that an existing ticket is to be modified and provides an identifier of the ticket. The form generation logic 104 retrieves the ticket from the database 520 and identifies the form instance 512 associated with the ticket. The form instance is retrieved directly from form instances database 513, bypassing the form instance generation described previously. The form instance and ticket are then sent to the UI 102, which renders the form based on the form instance and populates fields with the values specified in the ticket.

Overrides

Overrides allow adaption of a form definition. Specifically, the override mechanism allows attributes of form elements defined in a master form definition to be overridden based on predefined criteria. This allows certain fields or sections to be tailored for a given selection scenario and hence reduces the number of master form definitions required.

In preferred embodiments, overrides can be implemented against sections and fields. The principles for section and field overrides are the same. The following explains in detail the field override mechanism but it will be understood that the same approach can be applied to section overrides (and can be extended to overrides for other types of form elements).

In a particular implementation of the system, the override for a field can apply to any or all of the following properties or attributes of the field;
An optional field can be overridden such that it becomes mandatory (and vice versa)
A hidden field can be overridden such that it becomes visible; and a visible field can be overridden such that it becomes hidden if the field is optional (effectively removing the field from the form)
An override can specify a new label for a field (different from the label specified in the form definition)
An override can specify a default value for a field (different from the default value specified in the form definition)

Overrides are configured as part of the form definition within the database. As illustrated in FIG. 5, the logic layer retrieves overrides with the form definition from the database and processes the overrides (step 510) to build the JSON form instance 512 sent to the UI and the UI displays the form with the overridden element properties.

Figure 6:
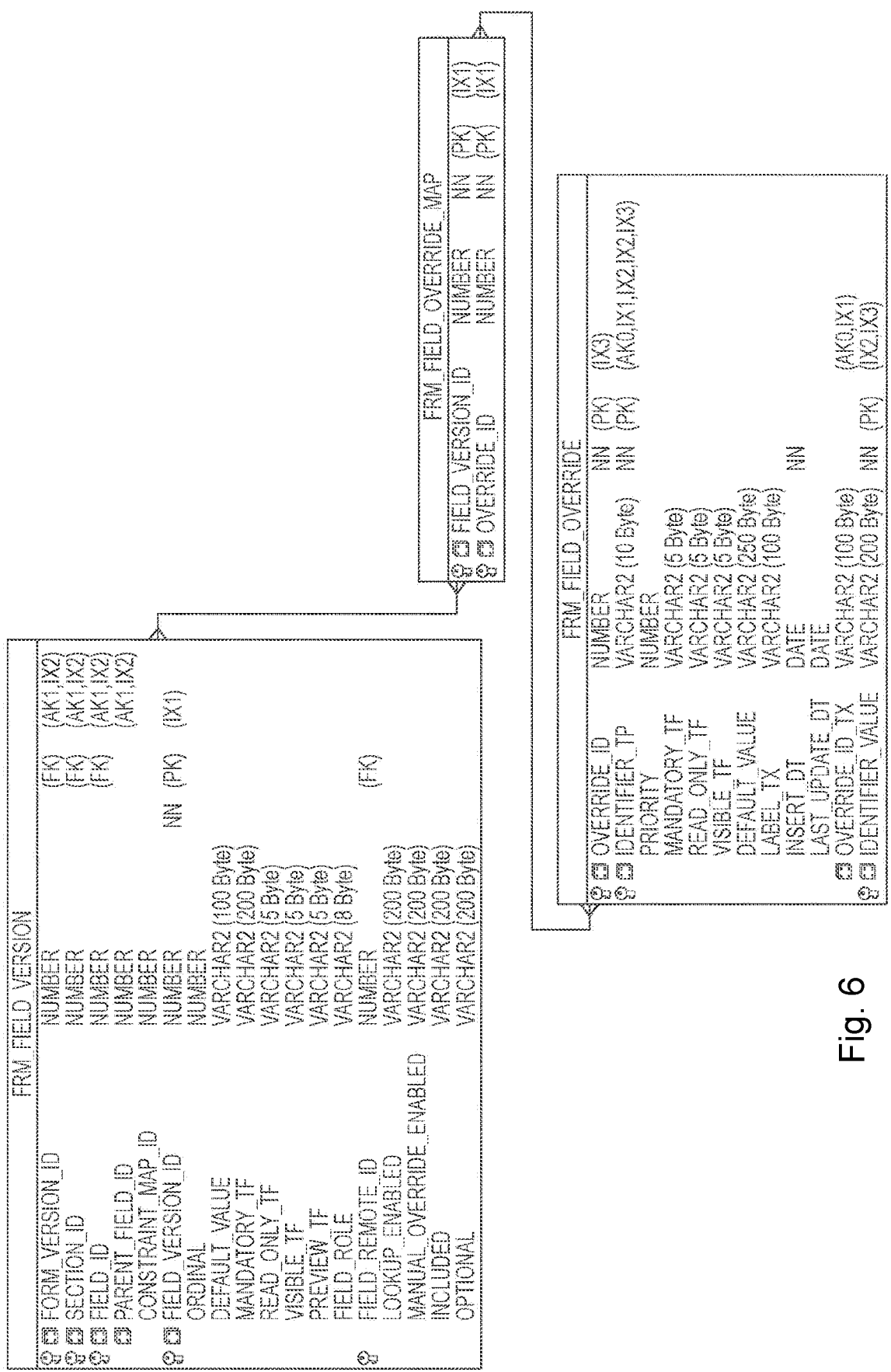
FIG. 6 illustrates data entities used to represent form element overrides.

Three tables are involved in the definition of the override, as depicted in FIG. 6. These are:
frm_field_version: This holds the record for a version of a field that has been associated to a version of a form, including a set of field properties (e.g. "MANDATORY_TF", "READ_ONLY_TF", "VISIBLE_TF" etc.)
frm_field_override: This defines the conditions for the override to occur, and what that override will consist of (in terms of modified values for given field properties)
frm_field_override_map: This defines a many to many relationship between a field version and a field override. By using this method a field may have many overrides, and an override may be used for many fields.

An example of an override definition is given in Table 1 below:

TABLE 1

| | |
|---|---|
| OVERRIDE_ID | 1000000 |
| IDENTIFIER_TP | txnType |
| PRIORITY | 1 |
| MANDATORY_TF | NULL |
| READ_ONLY_TF | NULL |
| VISIBLE_TF | FALSE |
| DEFAULT_VALUE | NULL |
| LABEL_TX | NULL |
| INSERT_DT | Dec. 6, 2015 |
| LAST_UPDATE_DT | Feb. 7, 2015 08:36 |
| OVERRIDE_ID_TX | CNCGn-DFP-NoSettValue |
| IDENTIFIER_VALUE | DFP |

The override definition includes an override identifier (OVERRIDE_ID). A priority field indicates an override priority; if multiple overrides are specified for an element, then settings specified in the higher-priority override are applied in preference to lower-priority overrides (if they conflict). The definition further defines a set of override values for various properties of the form element. In this example, MANDATORY_TF specifies whether the form field is mandatory, READ_ONLY specifies whether it is read only or modifiable, VISIBLE specifies whether the element is visible or hidden and DEFAULT_VALUE specifies a default value for an input field. If any of these values specify NULL (no value) then the original setting in the form definition is not modified by the override. If a value is specified (e.g. TRUE/FALSE for a Boolean attribute, any appropriate value for the DEFAULT_VALUE attribute or a text value for the LABEL_TX attribute), then the corresponding property of the form element takes that value instead of the value specified in the form definition.

If multiple overrides are applicable to a form element, they may be applied in priority order (from lowest to highest); again, NULL values in a higher priority override do not change a property value set by previous lower-priority override (or the original form definition) but non-NULL values do.

The specific set of properties are provided by way of example only and other properties could be provided to override other form element settings (for example, a colour property, size property or the like). Not all properties may be applicable (or defined) for all form element types.

Other override attributes provide insert/update dates and a text identifier of the override.

Application of overrides is governed by the "IDENTIFIER_TP" and "IDENTIFIER_VALUE" fields. IDENTIFIER_TP specifies the parameter controlling the override; if that parameter has the value specified by IDENTI- FIER_VALUE then the override is applied. In this example, for a txnType parameter of "DFP" the VISIBLE_TF property will be set to FALSE (making the field invisible) and the other properties are unaffected by the override.

The control parameter referenced by the override may be an external parameter (e.g. sent with the request or obtained from some other source).

Alternatively, the control parameter may be a form field value.

In a particular embodiment, multiple forms may cooperate to implement dynamic override behaviour. Whilst separately defined and generated, these forms may be presented to a user essentially as a single form (or sub-forms of a single form). In such arrangements, field values of one form may be used to control application of overrides in another form.

An example is illustrated in FIG. 7A. Here, the screen display 730 presented to the user actually consists of two forms, form 720 on the left having control fields 724 and 726, and form 722 on the right.

Form 720 is generated and displayed first (in the manner described above) and form 722 is initially empty. In response to the user entering values into one or more of the control fields 724, 726, a request for generation of second form 722 is generated. This behaviour may be specified in the form definition of the first form 720. A form instance for the second form 722 is then generated, again in the manner described above. However, in generating the second form instance 722, one or more overrides are applied based on the field values of the control fields 724 and/or 726. The form instance 722 is transmitted to and displayed at the client, with its exact appearance determined by the values entered into the control fields, in accordance with the overrides. The user can then continue data entry using form elements 728 in form 722.

Instead of form 722 being blank initially, a default form version could be generated and displayed at the same time as form 720, for example based on default values of override control fields 724, 726.

Furthermore, if a user modifies an override control field in form 720 after form 722 has been generated, form 722 may be regenerated and redisplayed based on the new override control value(s). This may involve discarding data already entered into form 722 or if appropriate entered values may be retained in the newly generated form instance.

The override definitions in form 722 can reference the relevant control fields 724, 726 in form 720 since form field (and field version) identifiers are unique in the database, and field definitions exist independently of form definitions, allowing a form to reference a field in another form. In an alternative approach, the control fields may additionally be included in the second form 722 except that in that form they may be defined as hidden fields. The hidden fields (which retain the values entered in the first form 720) then control application of the overrides directly within the second form.

Although forms 720 and 722 are in this example displayed alongside each other so as to appear as a single form, the forms could be displayed in different sections of the user interface or could be displayed one after the other. Furthermore, if the fields controlling the application of overrides in form 722 (i.e. the "driver" fields) are included as hidden fields in form 722 itself, then the values of those fields could have been entered previously on another form (where the corresponding fields appeared as regular, visible fields) or those values could be sourced in some other way altogether (e.g. by call to an external code routine, reference to a system or context variable, by a database query, etc.).

Information specifying where or how to obtain the field values can in that case be included in the relevant field definitions.

Thus the specific illustrated example shows just one way in which control fields can be defined. While in this example two override control fields are shown in form 720 by way of example, any number of such fields may be provided.

Use of a form field in the control form 720 (or in form 722 e.g. as a hidden field) as a control field for controlling an override may be defined in the form by specifying the field role for the field holding the value of the parameter.

Specifically, in the following field definition, the fieldRole property drives whether the field value is used as DRIVER, FIELD_OVERRIDE OR SECTION_OVERRIDE in a selector form. Here, the "mkt" field is used to control a field override.

```
"fields" : [ {
    "id" : "mkt",
    "label" : "Market",
    "fieldType" : "DROPDOWN",
    "required" : true,
    "readOnly" : false,
    "dataProvider" : "mktProvider",
    "preview" : true,
    "fieldRole" : "FIELD_OVERRIDE"
}
```

This field definition defines a dropdown field, with data values populated from an external source, referred to as a "provider" (here "mktProvider"), which represents a call to a data service (the call may for example be mapped to a particular SQL request at the storage layer 106). Various properties such as "required" and "readOnly" define behaviour and appearance of the field (e.g. mandatory, read only etc.). The "fieldRole" property indicates that the field can be referenced in an override, as a control parameter that determines whether the override applies.

As described previously, when generating a form with overrides defined, the logic layer first selects the master form (version), applies any overrides to it (retrieving the necessary control values e.g. control field values 724/726) and generates an override adjusted form instance and form JSON to send to the UI layer.

Versioning

Versioning is applied throughout the dynamic form engine to forms, sections, fields and their associated relationships. In preferred embodiments, versions of these components are immutable—that is they cannot be changed after they have been created. Any change to a component results in a new version.

Versioning is managed within the logic layer and storage layer. When the logic layer requests a form definition based on driver values and overrides it first checks to see if there is already a valid form instance matching the criteria. If a valid form instance is not available then it creates and stores a new form instance as described above in relation to FIG. 5. The form instance is created with a unique key based on the driver and override values, e.g.:

```
mkt=NZ,
productCode=CNC,
securityType=NO_TC_MAPPING,
txnType=DFP
```

Once created, the form definition JSON is stored against the form instance for performant reuse. Future attempts to access the same form version with the same driver/override control values retrieve the previously created form instance and corresponding JSON form definition for transmission to the UI layer.

A form instance is automatically expired when a new version is created.

Form Tickets (holding the data values entered by the user) are always created based on a form instance and if a form instance expires then the old form tickets will continue to use the expired form instance definition ensuring that all form tickets (i.e. the captured values) are fully versioned and that a user can return to any form used historically and view the exact form definition and values as used at the time of original entry.

Since for subsequent access to a previously created ticket, the previously created form instance is retrieved (and not regenerated) the rendered form will thus be identical to the one presented originally to the user.

The stored form instance reflects both the specific version of a form used as well as any overrides applied at the time the form instance was generated. This ensures that the versioning functionality and dynamic override mechanism—which provide flexibility and adaptability—do not lead to problems that could otherwise be caused by inconsistent/incompatible form versions or unanticipated behaviour resulting from changes occurring over time.

Since form instances are encoded as immutable JSON documents, they can also be cached at the client. Thus, in preferred embodiments the user interface layer maintains a cache of form instances. On requesting a specific form version the system determines whether a form instance matching the requested form version is stored in the cache (and where applicable, matching any relevant driver and override values, by way of the key stored with form instances as discussed above). If found, the local cached form instance JSON is retrieved instead of requesting it from the logic/storage layers.

The core components and capabilities described above together allow the presentation, validation and versioned storage of a form and its associated content entered by a user. The form generation is data-driven (based on the stored form definition) and configurable, making the portable dynamic form engine agile and extensible to a huge variety of form presentation and capture use cases and application contexts.

In an example, the system may be used to capture transactions, for example securities transactions. Capturing the data for a transaction as a form ticket that is tied to the form version used to enter the data can be particularly beneficial, since it ensures that transaction data can be viewed and manipulated later on, even if the form definitions have changed in the meantime. In addition to securities trading (or trading of other kinds of assets), such a data capture mechanism can be effective for other types of financial or commercial transactions. However, the disclosed system is not limited to such applications and can be applied in any data capture scenario.

Figure 7B:
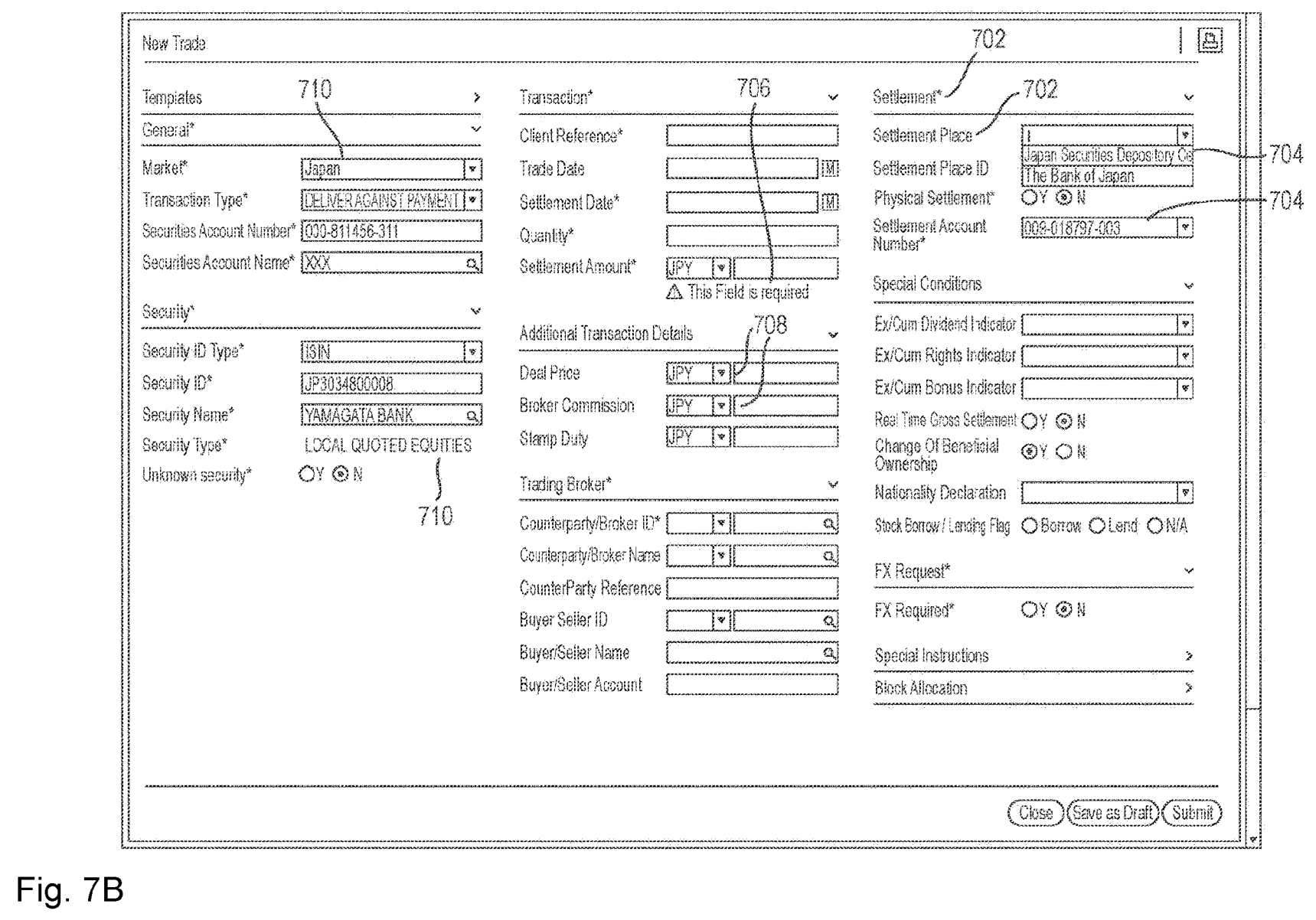

FIG. 7B illustrates some of the form features that are supported by the dynamic form engine in the context of a securities trading application example. Form definitions allow for definition of form structure with sections and fields (702). Different field types are supported, with virtual population of options (704). Form governance and data quality is provided by way of field attributes controlling appearance and function, for example whether fields are visible, editable or mandatory, as well as by way of front-end validation (706). Intelligent fields and automatic population are supported (708). Dynamic form structures are also supported (710); in this example the form structure is dynamically altered (e.g. by way of the override mechanism described above) to display different sections and/or fields) depending on what type of Security and what Market is chosen.

Figure 8A:
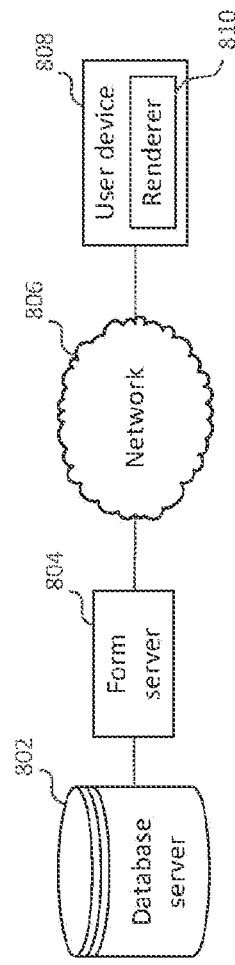
FIG. 8A depicts a system architecture for an embodiment of the system in overview.

The different system layers depicted in FIGS. 1 and 5 (UI layer 102, logic layer 104, and storage layer 106) may be implemented on separate hardware devices or combined in any appropriate fashion. FIG. 8A depicts one architecture in which the storage layer is implemented by a database server 802 (e.g. running an Oracle or other suitable Database Management System). The form generation logic layer is implemented in a form server 804. The UI layer is implemented in a user device 808 (e.g. a conventional personal computer terminal), including a rendering module 810 which renders received form definitions and provides the rendered forms as HTML to a browser application (not shown). The user device communicates with the form server over a network 806, which may be a local area network or wide area network such as the Internet.

In other embodiments, the data storage and form generation logic layers may be implemented on a single device (combining the functions of database server 802 and form server 804). Alternatively, the form generation logic could be provided as a software process running at the client device (combining the functions of form server 804 and user device 808), communicating with a remote database server over the Internet. All three layers could similarly be implemented on a single device (e.g. the user device 808).

Furthermore, the functions of particular components may be spread over multiple devices (e.g. form definitions and form tickets could be stored at separate database servers). Thus the described functionality can be distributed over any number of physical devices in any appropriate manner, the devices communicating over local or remote network connections as needed.

Figure 8B:
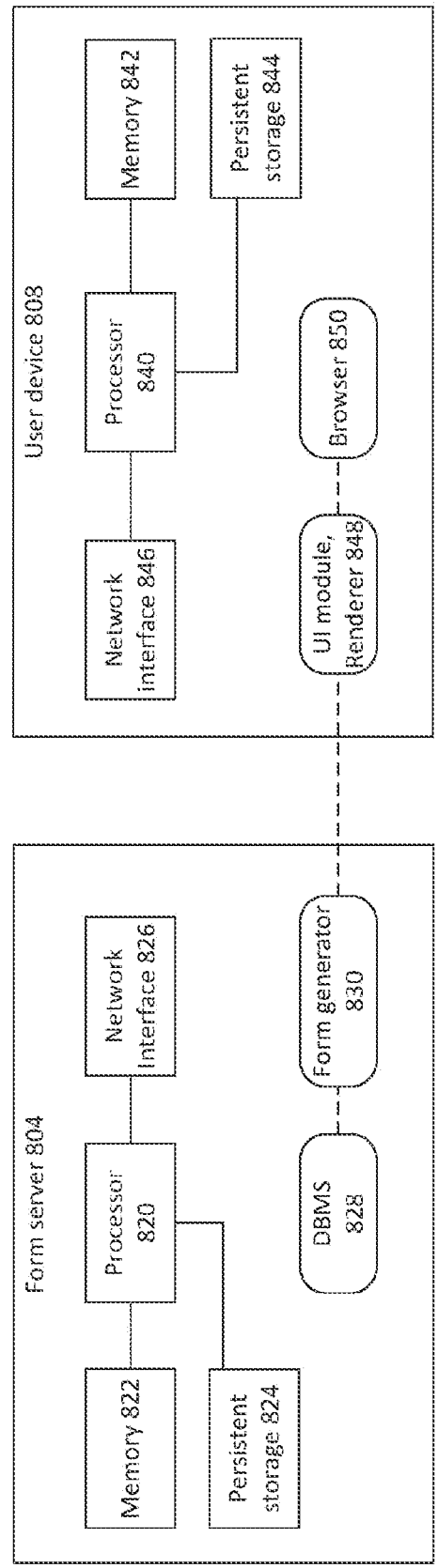
FIG. 8B depicts a system architecture including hardware and software components.

FIG. 8B depicts a further example, in which form server 804 includes the functions of the database server 802.

As depicted in FIG. 8B, the end user device 808 may comprise a conventional personal computer, mobile device or other user terminal device comprising memory 842 and persistent storage media 844 (e.g. hard disk, DVD-ROM etc.), both for storing computer-executable software code and data, one or more processors 840 for executing software and a network interface 846 for communication with external networks such as the Internet. The processor preferably runs web browser software 850 as well as a UI module including rendering engine 848.

The form server 804 preferably comprises conventional server hardware, comprising memory 822 and persistent storage media 824 (e.g. disk storage), both for storing computer-executable software code and data, one or more processors 820 for executing software and a network interface 826 for communication with external networks such as the Internet.

The processor runs software modules including a Database Management System (DBMS) 828 for implementing data storage functions of the storage layer 106, with data stored in persistent storage 824 and/or memory 822. The server also runs form generator module 830, implementing the functions of the logic layer 104. Form generator 830 communicates with the UI module 848 at the user device 808 over the connected network (e.g. including the Internet), to communicate form requests (e.g. as HTTP requests) and responses (e.g. as JSON documents encoding form instances).

The various methods and software elements described throughout this description are preferably provided in the form of computer-executable software code embodied in one or more tangible computer-readable storage media that may be executed by database server 802, form server 804, user device 808, or any other appropriate devices. Though described herein with functionality divided in a certain manner, functionality may be distributed between the system elements in any appropriate manner or could be implemented in a single device.

Embodiments of the invention described herein provide a computer-implemented method of generating a form definition for a user interface form. The method involves retrieving form definition data for a requested form from a database. One or more overrides are applied to the form definition data to modify properties of form elements. Form instance data for the modified form is generated and stored for reuse. The form instance data is transmitted to a rendering module at a client device for generation of a user interface form based on the form instance data.

It will be understood that the present invention has been described above purely by way of example, and modification of detail can be made within the scope of the invention.

The invention claimed is:

1. A computer-implemented method of generating a form definition for a user interface form for transmission to a user interface module, comprising:
  receiving a form request comprising form identification data identifying a requested form;
  retrieving from a database:
    form definition data for the requested form based on the form identification data, wherein the form definition data includes a plurality of data elements defining form elements and specifying values for properties of the form elements; and
    at least one override data element defining an override, the override data element specifying an override condition for applying the override and one or more form data modifications, wherein the override data element is associated with a given form element, the form data modifications defined for the override including one or more override values for one or more properties of the associated form element;
  generating form instance data, the form instance data comprising a data description of the form based on the retrieved form definition data, as modified based on the at least one override data element, the generating comprising, for the override data element:
    determining whether the override condition defined for the override is fulfilled; and
    in response to determining that the override condition is fulfilled, applying the one or more form data modification defined for the override to the retrieved form definition data, wherein applying the form data modification(s) comprises setting one or more properties of the associated form element to corresponding override values specified in the override data element; and
  outputting the form instance data to the user interface module for generation of a user interface form based on the form instance data.

2. A computer-implemented method according to claim 1, wherein the override condition of an override specifies a control parameter controlling applicability of the override, and a parameter condition relating to the control parameter, the method comprising determining that the override condition is fulfilled if the control parameter meets the specified parameter condition; wherein the parameter condition specifies one or more values of the control parameter, the method determining that the override condition is fulfilled if the specified control parameter has a value corresponding to the specified value or one of the specified values, and/or wherein the control parameter comprises a form field, the form field preferably associated with a second form, the second form optionally displayed to a user prior to or concurrently with the requested form.

3. A computer-implemented method according to claim 1, wherein the override data element specifies values for one or more properties of a form element, the properties defining one or more of:
  a visual appearance of a form element;
  interactive behaviour of a form element; and
  a data value associated with a form element.

4. A computer-implemented method according to claim 1, wherein the override specifies values for one or more properties of a form element, the properties including one or more of:
  a property specifying whether the form element is visible or invisible;
  a property specifying whether the form element is editable or read-only;
  a property specifying whether the form element is mandatory or optional;
  a property specifying a default value for the form element; and
  a property specifying a label to be displayed for the form element.

5. A computer-implemented method according to claim 1, wherein a given override is associated with one of: a data input form element, preferably an input field, and a form structuring form element, preferably a section element defining a section of the form.

6. A computer-implemented method according to claim 1, comprising applying a plurality of overrides to the retrieved form definition data, preferably in accordance with respective priority indicators associated with each override.

7. A method according to claim 1, further comprising generating the form instance data based on the form definition data in dependence on one or more control parameters, and associating values of the control parameters used to generate the form instance data with the stored form instance data in a database.

8. A method according to claim 7, further comprising, in response to a later form request specifying the given form, retrieving and outputting the stored form instance data in response to the request; the later form request requesting the given form with the same one or more control parameter values, the method comprising retrieving and outputting the previously stored form instance data based on the request and control parameter values.

9. A computer implemented method according to claim 1, comprising receiving form input data corresponding to the form following interaction with the form by a user, the form input data comprising data values for one or more input field form elements of the form, and storing the form input data in a database as a form input data record, wherein the form input data record is associated in the database with the form instance data generated for the form; and
  further comprising, in response to a request to view or edit the form input data record storing data previously captured using the form, identifying the associated form instance data, and transmitting the identified form instance data and the input data record to the user interface module.

10. A computer-implemented method according to claim 1, wherein the database stores versioned form definitions.

11. A computer-implemented method according to claim 10, comprising, in response to a request to create a new input data record using a specified form, identifying a latest version of the form definition for the specified form stored in the database and generating the form instance data based on the identified form definition version.

12. A computer-implemented method according to claim 10, comprising, in response to a request to modify an existing input data record, identifying a version of a form definition used to input the input data record from a plurality of versions of the form definition, and outputting form instance data defining a form for editing the input data record based on the identified version of the form definition, wherein the identifying step uses a reference stored with the existing input data record to the form definition version used to input the input data record.

13. A computer-implemented method according to claim 1, further comprising, at the user interface module:
receiving the form instance data;
generating a user interface form based on the form instance data; and
displaying the user interface form.

14. A computer-implemented method according to claim 13, wherein the generating step comprises generating a web document comprising an HTML document representing the form, and wherein the displaying step comprises outputting the web document to a browser application for display; the method further comprising:
receiving a render mode indicator identifying one of a predetermined set of rendering modes;
generating the user interface form based on the identified render mode;
wherein the user interface module modifies one or both of the appearance and the behaviour of the form in dependence on the selected render mode; and
wherein the render modes include one or more of:
a render mode for generating a form to display data without permitting editing of the data; and
a render mode for generating a form for displaying and editing data.

15. A computer-implemented method according to claim 1, comprising, at the user interface module, determining whether form instance data for a requested form has been cached at the user interface module;
if so, retrieving the locally cached form instance data and generating a form for display based on the locally stored form instance data; and
if not, sending a request to retrieve or generate the form instance data to a form server, receiving form instance data from the server, and generating a form for display based on the received form instance data.

16. A computer-implemented method of generating a form definition for a user interface form for transmission to a user interface module, comprising:
receiving a form request comprising form identification data identifying a requested form;
retrieving from a database form definition data for the requested form based on the form identification data;
generating form instance data based on the retrieved form definition data and one or more control parameters relating to the request, the form instance data comprising a data description of the requested form;
storing the form instance data in the database;
outputting the form instance data to the user interface module at a client device for generation of a user interface form based on the form instance data;
receiving from the client device form input data including one or more input field values for the form in response to user interaction with the form;
storing the form input data as an input data record; and
associating the input data record with the stored form instance data in the database.

17. A computer implemented method according to claim 16, further comprising:
receiving a further request, wherein the further request is a request to view or edit the previously stored input data record;
retrieving the stored form instance data based on the request; and
transmitting the stored form instance data to the client device for generation of a form for viewing or editing the input data record.

18. A computer-implemented method according to claim 17, wherein the request includes an identifier for identifying the stored input data record, the method including accessing the stored input data record using the identifier; and identifying the stored form instance data associated in the database with the stored input data record.

19. A non-transitory computer-readable medium comprising software code adapted, when executed on a data processing apparatus, to perform a method of generating a form definition for a user interface form for transmission to a user interface module, comprising:
receiving a form request comprising form identification data identifying a requested form;
retrieving from a database:
form definition data for the requested form based on the form identification data, wherein the form definition data includes a plurality of data elements defining form elements and specifying values for properties of the form elements; and
at least one override data element defining an override, the override data element specifying an override condition for applying the override and one or more form data modifications, wherein the override data element is associated with a given form element, the form data modifications defined for the override including one or more override values for one or more properties of the associated form element;
generating form instance data, the form instance data comprising a data description of the form based on the retrieved form definition data, as modified based on the at least one override data element, the generating comprising, for the override data element:
determining whether the override condition defined for the override is fulfilled; and
in response to determining that the override condition is fulfilled, applying the one or more form data modifications defined for the override to the retrieved form definition data, wherein applying the form data modification(s) comprises setting one or more properties of the associated form element to corresponding override values specified in the override data element; and
outputting the form instance data to the user interface module for generation of a user interface form based on the form instance data.

* * * * *